Patented Aug. 30, 1949

2,480,185

UNITED STATES PATENT OFFICE 2,480,185

ESTERS OF MIXTURES OF POLYOXYALKYLENE MONOHYDROXY COMPOUNDS

Harvey R. Fife, Mount Lebanon, Pa., and Frederick H. Roberts, Charleston, W. Va., assignors to Carbide and Carbon Chemicals Corporation, a corporation of New York No Drawing. Application July 25, 1947,
Serial No. 763,746

6 Claims. (Cl. 260—410.6)

This invention relates to esters of mixtures of aliphatic monoethers of polyoxyalkylene glycols. It is particularly concerned with esters of those mixtures having relatively high average molecular weight, and comprising molecules containing polyoxyalkylene chains formed predominantly of the oxyethylene group, $-OC_2H_4-$, and the oxy 1,2-propylene group, $-OC_2H_3.CH_3-$. Such mixtures may result, for instance, from the reaction of monohydroxy aliphatic alcohols with alkylene oxide mixtures containing, for the most part, ethylene oxide and 1,2-propylene oxide. The mixtures of aliphatic monoethers with polyoxyalkylene glycols are more fully described in our copending application Serial No. 538,340 filed June 1, 1944, now Patent No. 2,425,755, of which this application is a continuation-in-part.

The mixtures of monohydroxy alcohols which are esterified according to the present invention may be obtained by the addition, to a monohydroxy aliphatic alcohol, of a mixture of alkylene oxides containing ethylene oxide and 1,2-propylene oxide in an oxide ratio from 75–25 to 10–90 ethylene oxide to 1,2-propylene oxide. By oxide ratio from 75–25 to 10–90 is meant that, in the oxide mixture which may be used in forming such monohydroxy alcohol addition product, the amount of 1,2-propylene oxide in the mixture is from one-third to nine times the amount of ethylene oxide present, by weight, the parts or proportion of the 1,2-propylene oxide being given last.

The reaction which takes place between the alcohol and the ethylene oxide and the 1,2-propylene oxide seems to be a simple addition wherein the alkylene oxide molecules undergo conversion to the corresponding oxyalkylene radicals as illustrated for any given molecule by the following general equation:

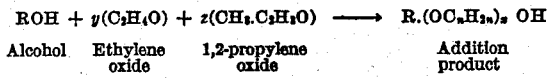

| ROH | + | $y(C_2H_4O)$ | + | $z(CH_3.C_2H_3O)$ | → | $R.(OC_nH_{2n})_x$ OH |
|---|---|---|---|---|---|---|
| Alcohol | | Ethylene oxide | | 1,2-propylene oxide | | Addition product | where ROH is an aliphatic monohydroxy alcohol;

$y$ and $z$ represent the mols of ethylene oxide and 1,2-propylene oxide respectively; $n$ is both 2 and 3 in a single molecule, the total number of times $n$ has a value of 2 being equal to $y$ and the total number of times $n$ has a value of 3 being equal to $z$; and $x$ is the total number of such oxyalkylene groups, being equal to $y+z$.

From such properties as the average molecular weight, refractive index, density, viscosity, rate of change of viscosity with change in temperature, as well as upon theoretical considerations, it appears that these products are complex mixtures of monohydroxy polyoxyalkylene aliphatic monoethers having polyoxyalkylene chains of different lengths and different internal configurations with the hydroxyl group appearing at one end of the chain and the aliphatic group of the starting alcohol at the other, and containing in the single molecules both the oxyethylene group and the oxy 1,2-propylene group.

By way of illustration the molecular weights of the oxyethylene-oxy 1,2-propylene chains of compounds having five oxyalkylene groups to the molecule would be 234, 248, 262 and 276, respectively, exclusive of the alcohol, depending upon whether one, two, three or four oxy 1,2-propylene groups are present therein; and in a mixture of such compounds the average molecular weight attributable solely to the oxyalkylene chain would be between 234 and 276 with the oxide ratio corresponding thereto being between 75.2–24.8 and 15.9–84.1. Similarly, the molecular weights of the oxyethylene-oxy 1,2-propylene chains of compounds having six oxyalkylene groups to the molecule with two, three, four and five oxy 1,2-propylene groups present therein would be 292, 306, 320 and 334, respectively; and in mixtures of such compounds the average molecular weight attributable solely to the oxyalkylene chain would be between 292 and 334 with an oxide ratio between 60.3–39.7 and 13.2–86.8 corresponding thereto. Compounds having a single oxypropylene group are omitted since their oxide ratio falls definitely above the 75–25 limit. In compounds having a total of seven oxyethylene and oxy 1,2-propylene groups to the molecule, of which the number of oxy 1,2-propylene groups are two, three, four, five and six, the molecular weight of the polyoxyalkylene chain would be 336, 350, 364, 378 and 392, respectively; and in mixtures of such compounds the average molecular weight attributable solely to the polyoxyalkylene chain would be between 336 and 392, with an oxide ratio between 65.5–34.5 and 11.2–88.8 corresponding thereto. Likewise, in compounds having two, three, four, five, six and seven oxy 1,2-propylene groups in an oxyethylene oxy 1,2-propylene chain of eight oxyalkylene groups, the molecular weights of such chains would be 380, 394, 408, 422, 436 and 450 respectively, with the average molecular weights attributable to the polyoxyalkylene chain in a mixture of such compounds being between 380 and 450, and the oxide ratio corresponding thereto being between 69.5–30.5 and 9.8–90.2. To each of the foregoing values for molecular weights and average molecular weights, there is to be added a value not less than 32, the molecular weight of methanol, the lowest member of the aliphatic alcohol series.

A product containing in admixture the monohydroxy aliphatic monoethers of the foregoing polyoxyalkylene chains, having proportions between 75–25 and 10–90, would have as many as nineteen constituents (exclusive of isomers) which differ from one another in the molecular weights attributable to the polyoxyalkylene chains yet which have a spread of only from five to eight oxyalkylene groups between the smallest and largest molecules, and a spread of from 266 to 482 in the molecular weights of the methyl monoethers. The complexity of the mixture may be due not only to the difference in molecular weights of the chains but also to the large number of isomers which may be formed by random (i. e., interspersed) distribution of the oxyethylene and oxy 1,2-propylene groups, with consequent variations in internal configuration from molecule to molecule, even among those of the same molecular weight. The complexity increases with molecular weight. These products may be referred to as mixtures of monohydroxy heterized oxyethylene oxy 1,2-propylene aliphatic monoethers, and by the term "heterized" we mean that the monoethers vary in internal configuration from molecule to molecule, such variation arising out of a randomness of the distribution of the oxyethylene and the oxy 1,2-propylene groups therein, such as results, for instance, from the concurrent reaction of ethylene oxide and 1,2-propylene oxide with an aliphatic monohydroxy alcohol.

Using ethylene oxide-1,2-propylene oxide ratios from 75–25 to 10–90 by weight, and starting alcohols having one, two, three, four and more carbon atoms to the molecule, we have made a number of products having average molecular weights ranging from about 500 to upwards of 5,000. They may be obtained as normally liquid products which are characterized by having a relatively low rate of change of viscosity with change in temperature; the actual viscosity of the product as well as such other properties as density, refractive index and the like being dependent on the starting alcohol, the oxide ratio and the average molecular weight. For a given starting alcohol and oxide ratio, the viscosity, density and refractive index increase with molecular weight, and, for alcohols having from one up to fourteen or more carbon atoms, and for oxide ratios from 75–25 to 10–90, the viscosities at a given temperature appear to lie in a relatively narrow band or zone which, at a temperature of 210° F., extends from 3 to 10 centistokes at average molecular weights of about 500 to 800, up to 20 to 50 centistokes at average molecular weights of about 1,500 to 2,000. For oxide ratios from 50–50 to 10–90, at a temperature of 20° F., the viscosities extend from 150 to 500 centistokes at average molecular weights of about 500 to 800, up to 1,500 to 5,000 centistokes at average molecular weights of 1,500 to 2,000.

In general, products made from oxide mixtures having a higher proportion of ethylene oxide than of propylene oxide exhibit a substantially greater degree of miscibility with water, or a greater water-tolerance, than those made from oxide mixtures containing a preponderance of 1,2-propylene oxide. By way of illustration, a butyl monoether having an oxide ratio of 50–50 made by our preferred method, under water-free conditions using an alkali metal hydroxide as catalyst, is characterized by the unusual property of being miscible with cold water up to about 50 per cent or more of the product, by volume, and relatively immiscible with hot water. An aqueous solution containing about 50 per cent of such a product separates into two layers at temperatures of about 40° to 60° C. or higher. The one layer is a solution of water in the product and the other layer is a solution of the product in water. With increase in the 1,2-propylene oxide content the water-tolerance of the product decreases, and at an oxide ratio of 25–75, for instance, the products are substantially immiscible with water, even at low temperature; except possibly at low average molecular weights. On the other hand, products made from ethylene oxide-1,2-propylene oxide mixtures in oxide ratios from 75–25 to 60–40 may require a temperature of about 95°–100° C. or even higher to cause the separation of two layers from aqueous solutions of the products, but the temperature at which separation may take place in any particular case will depend upon a number of factors including the average molecular weight, the starting alcohol, and to some extent, the conditions under which the product is made.

Products made from mixtures having oxide ratios from about 50–50 to 10–90 are also characterized by the very useful property of remaining in the fluid state at low temperatures as low as —50° C., and below. The temperature at which solidification of the product takes place increases with increase in ethylene oxide content above 50 per cent. Products made from mixtures having oxide ratios from 75–25 to 60–40 usually contain a solid phase at temperatures as high as 0° C. Even at temperatures above 10° C., presence of a solid or crystal phase may be observed by the haziness or cloudiness of the mixture, but the temperature at which solidification may take place in any particular case will here again depend upon a number of factors including the average molecular weight, the starting alcohol and to some extent, the conditions under which the product is made.

Methods of preparing the aliphatic monoethers of polyoxyalkylene glycols which are esterified in accordance with the present invention are described in our copending application Serial No. 538,340, filed June 1, 1944, now Patent No. 2,425,755.

According to this invention, mixtures of aliphatic monoethers of polyoxyalkylene glycols containing both oxyethylene and oxy 1,2-propylene groups in the molecule and having an average molecular weight of at least 500 by acetyl values attributable to said groups, are partially or completely esterified with organic carboxylic acids consisting solely of the elements carbon, hydrogen and oxygen and having up to two carboxyl groups to the molecule and from 2 to 20 carbon atoms in the molecule. Esterification of these polyoxyalkylene glycol monoethers with carboxylic acids results in an important modification of the properties of the monoethers. In general, esters corresponding to the monoethers which are soluble in cold water are relatively insoluble in both hot and cold water. In this property the esters of the present invention differ from the esters of high-molecular weight polyoxyethylene glycols or their monoethers which esters are usually water-soluble. Also, the esters of those polyoxyalkylene glycol monoethers which are insoluble in cold water have reduced capacity to absorb water.

Esterification of mixtures of aliphatic monoethers of polyoxyalkyene glycols containing both oxyethylene and oxy 1,2-propylene groups in the molecule also changes their viscosity; the degree and direction of the change depending on the type of carboxylic acid esterified. Esterification of the monoethers with a dicarboxylic acid, such as succinic, adipic or phthalic acids, results in esters having a higher viscosity than the original polyoxyalkylene glycol monoethers. Esterification of the monoethers with a lower aliphatic monocarboxylic acid, such as acetic acid, butyric acid or 2-ethyl hexanoic acid, results in esters having a lower viscosity than the starting material. On the other hand, esterification of the monoethers with a higher fatty acid, such as stearic acid, results in esters having a higher viscosity than the original monoethers. In general, the monoether aliphatic esters exhibit less change in viscosity with change in temperature than do the monoethers; in other words, the monoether aliphatic esters have a higher viscosity index. Furthermore, the monoether esters wet metal surfaces more readily and are adsorbed thereon to a greater degree than the monoethers, making the monoether esters improved lubricants for metal.

Esterification of the monoethers may be carried out by reacting the monoethers either with the free carboxylic acids, or the corresponding anhydrides or acyl chlorides. Ester exchange reactions may be carried out with glycerides, such as castor oil.

The following examples will illustrate the invention.

EXAMPLE 1.—ACETATE ESTERS

*General procedure*

The starting material was a reaction product of butanol with a mixture of ethylene oxide and propylene oxide having an oxide ratio of 50-50, the reaction product having an average molecular weight of 2545 and a viscosity at 100° F. of 278.5 centistokes. Four hundred and seventy-five (475) grams (0.187 mole) of this material were placed in a glass reaction vessel equipped with a stirrer, an ebullition tube for introducing gases, and a distillation column, and 16.1 grams (0.205 mole) of acetyl chloride were added dropwise over a period of 15 minutes while maintaining the temperature in the vessel at 35 to 49° C. The charge was stirred for three hours to complete the reaction. At the end of this time, nitrogen was introduced through the ebullition tube, and hydrogen chloride and excess acetyl chloride were stripped from the product at a pressure of 41 mm. Hg absolute pressure and a final kettle temperature of 153° C. Saponification showed that the product contained 97% by weight of the acetate ester, and the product had a viscosity of 230 centistokes (cstks.) at 100° F.

The acetate esters of a number of related butyl monoethers having different oxide ratios and varying molecular weights were prepared in a similar manner. Certain properties of these butyl monoethers and their acetate esters are tabulated below:

| Butyl Monoethers | | | | | Acetates of Butyl Monoethers | | | | |
|---|---|---|---|---|---|---|---|---|---|
| Mol. Wt. | Visc., Centistokes | | | Visc. Ratio 100° F./210° F. | Run No. | Visc., Centistokes | | | Visc. Ratio 100° F./210° F. |
| | 100° F. | 210° F. | 0° F. | | | 100° F. | 210° F. | 0° F. | |
| OXIDE RATIO 75-25 | | | | | | | | | |
| 735 | 38.2 | 7.98 | ----- | 4.78 | 1 | 31.6 | 7.2 | ----- | 4.39 |
| 2,360 | 271 | 45.6 | ----- | 5.94 | 2 | 233 | 40.8 | ----- | 5.71 |
| OXIDE RATIO 50-50 | | | | | | | | | |
| 739 | 42.9 | 8.91 | 1,571 | 4.81 | 3 | 37.9 | 8.25 | 1,260 | 4.60 |
| 919 | 53.1 | 10.8 | 2,099 | 4.92 | 4 | 43.1 | 9.65 | 1,410 | 4.46 |
| 1,790 | 143.7 | 26.0 | 6,930 | 5.52 | 5 | 135 | 25.0 | 6,590 | 5.40 |
| 2,545 | 278.5 | 48.1 | 14,600 | 5.78 | 6 | 230 | 41.8 | 12,959 | 5.51 |
| 2,770 | 384 | 65.0 | ----- | 5.90 | 7 | 353 | 61.7 | ----- | 5.72 |
| OXIDE RATIO 25-75 | | | | | | | | | |
| 963 | 52.5 | 10.3 | 2,085 | 5.10 | 8 | 45.6 | 9.7 | 1,665 | 4.70 |
| 1,850 | 231.9 | 39.2 | 13,376 | 5.92 | 9 | 211 | 37.4 | 11,155 | 5.65 |
| OXIDE RATIO 10-90 | | | | | | | | | |
| 1,446 | 95.4 | 16.7 | 5,193 | 5.70 | 10 | 74.9 | 15.8 | 4,020 | 4.74 |
| 1,635 | 134.7 | 23.2 | 7,830 | 5.80 | 11 | 126 | 22.4 | 7,690 | 5.62 |

Other properties of the acetates of the monobutyl ethers are given below:

Acetates of butyl monoethers

| Run No. | Oxide Ratio | Sp. Visc. Benzene Solution 18° C.[1] | Absolute Density 20° C. | Refractive Index 20° C. | Visc. Index A. S. T. M. D-567-41 | Flash Point, ° F. | Misc. Temp. with Equal Volume Mineral Oil SAE 30, ° C.[2] |
|---|---|---|---|---|---|---|---|
| 1 | 75-25 | .1381 | 1.0560 | 1.4546 | 165 | 406 | 182 |
| 2 | 75-25 | .3268 | 1.0814 | 1.4630 | 139 | 406 | >200 |
| 3 | 50-50 | .1456 | 1.0399 | 1.4527 | 160 | 417 | 167 |
| 4 | 50-50 | .1589 | 1.0336 | 1.4522 | 159 | 423 | 157 |
| 5 | 50-50 | .2583 | 1.0505 | 1.4580 | 145 | 446 | >200 |
| 6 | 50-50 | .3393 | 1.0515 | 1.4582 | 139 | 408 | >200 |
| 7 | 50-50 | .3575 | 1.0535 | 1.4592 | 135 | 426 | >200 |
| 8 | 25-75 | .1471 | 1.0157 | 1.4496 | 154 | 397 | 120 |
| 9 | 25-75 | .3161 | 1.0286 | 1.4543 | 139 | 410 | 176 |
| 10 | 10-90 | .1875 | 1.0064 | 1.4493 | 154 | 399 | 109 |
| 11 | 10-90 | .2237 | 1.0110 | 1.4507 | 143 | 428 | 125 |

[1] Specific viscosity = $\frac{\text{viscosity of 4.0\% solution by wt.}}{\text{viscosity of solvent}} - 1$.

[2] Miscibility temperature = temperature at which equal volumes are miscible.

In addition to their utility as metal lubricants, the acetates of the butyl monoethers are useful as plasticizers for nitrocellulose.

EXAMPLE 2.—2-ETHYLHEXANOATE ESTERS

General procedure

The starting material was a reaction product of butanol with a mixture of equal parts by weight of ethylene oxide and propylene oxide having an average molecular weight of 912 and a viscosity of 53.9 centistokes at 100° F. Four hundred (400) grams (0.44 mole) of the resulting mixture of butyl monoethers were placed in a glass reaction vessel equipped with a stirrer, an ebullition tube for introducing gases, and a distillation column, and 90.1 grams of a mixture of 2-ethylhexanoic acid (30%) and 2-ethylexanoyl chloride (70%) corresponding to 0.385 moles of the acid chloride were added, dropwise, over a period of an hour at 36 to 42° C. The temperature in the vessel was then reduced to 26° C. and maintained there for 5 hours. The temperature in the kettle was then slowly raised to 147° C. and hydrogen chloride and excess acid and acid chloride were then stripped from the vessel at 15 mm. Hg absolute pressure with the aid of carbon dioxide which was introduced through the ebullition tube.

Analysis of the product by saponification showed that it contained 97% by weight of the 2-ethylhexanoate esters. It had a viscosity of 52.2 centistokes at 100° F.

The 2-ethylhexanoate esters of several related butyl monoethers having different oxide ratios and varying molecular weights were prepared in a similar manner. Certain properties of these butyl monoethers and their 2-ethylhexanoate esters are tabulated below:

| Butyl Monoethers | | | | | 2-Ethylhexanoates of Butyl Monoethers | | | |
|---|---|---|---|---|---|---|---|---|
| Oxide Ratio | Mol. Wt. | Visc., Centistokes | | Visc. Ratio. 100° F./210° F. | Run No. | Visc., Centistokes | | Visc. Ratio 100° F./210° F. |
| | | 100° F. | 210° F. | | | 100° F. | 210° F. | |
| 75-25 | 1,365 | 111.5 | 20.5 | 5.44 | 1 | 100 | 19.1 | 5.24 |
| 50-50 | 912 | 53.9 | 10.66 | 5.05 | 2 | 52.2 | 10.6 | 4.92 |
| 50-50 | 2,455 | [1] 885 | | | 3 | [1] 785-815 | 118 | 6.65 |
| 10-90 | 586 | 21.4 | 4.7 | 4.56 | 4 | 20.8 | 4.78 | 4.35 |
| 10-90 | 1,808 | 174.6 | 29.2 | 5.97 | 5 | 152 | 26.8 | 5.65 |

[1] Centipoises.

Other properties of the 2-ethylhexanoate esters of the butyl monoethers are given below:

2-ethylhexanoates of butyl monoethers

| Run No. | Oxide Ratio | Sp. Visc. Benzene Solution 18° C. | Absolute Density 20° C. | Refractive Index 20° C. | Visc. Index A. S. T. M. D-567-41 | Misc. Temp. with Equal Volume Mineral Oil, SAE 30, ° C. |
|---|---|---|---|---|---|---|
| 1 | 75-25 | .2568 | 1.0540 | 1.4598 | 148 | >200 |
| 2 | 50-50 | .1643 | 1.0138 | 1.4523 | 156 | 119 |
| 3 | 50-50 | .5411 | 1.0520 | 1.4595 | | >200 |
| 4 | 10-90 | .0976 | 0.9667 | 1.4431 | 165 | 16 |
| 5 | 10-90 | .2732 | 0.9979 | 1.4505 | 144 | 108 |

The 2-ethylhexanoate esters of the butyl monoethers are valuable as crankcase lubricants for internal combustion engine. In general, these esters are more miscible with mineral oils than are the acetate esters of the previous example. The miscibility of the 2-ethylhexanoate esters of the butyl monoethers with mineral oil increases with the proportion of oxypropylene groups in the molecule, and decreases with the molecular weight.

EXAMPLE 3.—STEARATE ESTERS

General procedure

The reaction vessel was made of glass and was equipped with a stirrer, a reflux condenser and a decanter. Benzene (200 cc.) and 461.5 grams (0.5 mole) of the reaction product of butanol with a mixture of equal parts by weight of ethylene oxide and propylene oxide having an average molecular weight of 912 and a viscosity of 53.9 centistokes at 100° F. were added to the vessel. The mixture was refluxed for about 7 hours at a liquid temperature of 103–9° C. to remove any water present as its azeotrope with benzene. The temperature of the liquid was then increased to 125° C. and 70 cc. of benzene removed from the system. After cooling to 87° C., 151 grams (0.5 mole) of stearyl chloride were added dropwise over a period of 3 hours at about 70° C. Heating of the charge was continued for 7 hours at 60 to 65° C., after which benzene and hydrogen chloride were removed by vacuum stripping to a liquid temperature of 170° C. under about 15 mm. of Hg absolute pressure, using carbon dioxide for ebullition.

There was recovered 548.7 grams of the stearate ester, a yield of 91.5% based on the butyl monoether charged. The product analyzed 100% stearate ester by saponification. It had a viscosity of 70.1 centistokes at 100° F.

By a similar procedure, other stearate esters of other butyl monoethers were prepared. The physical properties follow:

EXAMPLE 4.—BENZOATE ESTERS

*General procedure*

To 400 grams (0.44 mole) of the butyl monoethers of oxyethylene oxy 1,2-propylene glycols, having an oxide ratio of 50–50, an average molecular weight of 912 and a viscosity of 53.9 centistokes at 100° F., in a vessel as described previously were added 66.6 grams (0.474 mole) of benzoyl chloride, dropwise, over a period of 25 minutes at 31 to 39° C. The charge was stirred for eight hours. Then the free hydrogen chloride and unreacted benzoyl chloride were removed by bubbling carbon dioxide through the liquid, and stripping the product to a liquid temperature of 158° C. at an absolute pressure of 26 mm. of Hg. The reaction product contained by weight 65% ester by saponification analysis, and a portion of the product was esterified further as follows:

To 257 grams of the above product (containing 0.1 mole of unreacted butyl monoethers) were added 15.5 grams (0.11 mole) of benzoyl chloride, dropwise, over a period of about one hour at 52 to 77° C. The charge was reacted for (10) ten hours at 65° C., and then stripped of volatile constituents at about 20 mm. of Hg absolute pressure to a final liquid temperature of 160° C. A total of 261 grams of product was obtained, analyzing 95% benzoate ester by saponification

| Butyl Monoethers | | | | | Stearates of Butyl Monoethers | | | |
|---|---|---|---|---|---|---|---|---|
| Oxide Ratio | Mol. Wt. | Visc., Centistokes | | Visc. Ratio 100° F./210° F. | Run No. | Visc., Centistokes | | Visc. Ratio 100° F./210° F. |
| | | 100° F. | 210° F. | | | 100° F. | 210° F. | |
| 50–50 | 912 | 53.9 | 10.66 | 5.05 | 1 | 70.1 | 14.2 | 4.93 |
| 50–50 | 2,455 | [1] 885 | | | 2 | 1,121 | 175 | 6.41 |
| 10–90 | 1,547 | 115.1 | 19.8 | 5.82 | 3 | [1] 1,154 143 | 26.8 | 5.34 |

[1] Centipoises.

Other physical properties of the stearates of the butyl monoethers are tabulated below:

*Stearates of butyl monoethers*

| Run No. | Oxide Ratio | Sp. Visc. Benzene Solution 18° C. | Absolute Density 20° C. | Refractive Index 20° C. | Visc. Index A. S. T. M. D-567-41 | Misc. Temp. with Equal Volume Mineral Oil, SAE 30, °C |
|---|---|---|---|---|---|---|
| 1 | 50–50 | .1987 | 0.9975 | 1.4559 | 153 | 79 |
| 2 | 50–50 | .6177 | 1.0425 | 1.4612 | | >200 |
| 3 | 10–90 | .2729 | 0.9870 | 1.4529 | 146 | 64 |

The stearate esters of the butyl monoethers are useful as gear oils, textile lubricants, emulsifying agents and as lubricants in metal drawing.

analysis. Two other benzoate esters of related butyl monoethers were also prepared, the products containing 92 to 97% benzoate ester by weight. The physical properties of these preparations follow:

| Butyl Monoethers | | | | | Benzoates of Butyl Monoethers | | | |
|---|---|---|---|---|---|---|---|---|
| Oxide Ratio | Mol. Wt. | Visc., Centistokes | | Visc. Ratio 100° F./210° F. | Run No. | Visc., Centistokes | | Visc. Ratio 100° F./210° F. |
| | | 100° F. | 210° F. | | | 100° F. | 210° F. | |
| 75–25 | 1,204 | 85.9 | 15.7 | 5.36 | 1 | 98.3 | 17.2 | 5.71 |
| 50–50 | 912 | 53.9 | 10.66 | 5.05 | 2 | 69.5 | 12.5 | 5.55 |
| 10–90 | 1,547 | 115.1 | 19.8 | 5.81 | 3 | 132 | 21.1 | 6.25 |

Benzoates of butyl monoethers

| Run No. | Oxide Ratio | Sp. Visc. Benzene Solution 18° C. | Absolute Density 20° C. | Refractive Index 20° C. | Visc. Index | Misc. Temp. with Equal Volume Mineral Oil, SAE30, °C. |
|---|---|---|---|---|---|---|
| 1 | 75-25 | .1949 | 1.0951 | 1.4720 | 145 | >200 |
| 2 | 50-50 | .1649 | 1.0507 | 1.4679 | 147 | 162 |
| 3 | 10-90 | .2051 | 1.0196 | 1.4601 | 141 | 116 |

It will be noted that the benzoate esters differ from the aliphatic esters in that they have a higher viscosity ratio 100° F./210° F. than the original butyl monoethers. Thus, they are less suitable as lubricants than are the aliphatic esters.

EXAMPLE 5.—SUCCINATE ESTER

There was charged to a glass reaction vessel equipped with a stirrer, reflux condenser and decanting head, 461.5 grams (0.5 mole) of the butyl monoethers of oxyethylene oxy 1,2-propylene glycols having an oxide ratio of 50-50, an average molecular weight of 912 and a viscosity of 53.9 centistokes at 100° F. Then 300 cc. of benzene were added and the mixture refluxed about 7 hours at a liquid temperature of 93-95° C. to remove small amounts of water azeotropically. At the end of this period, 54 cc. of benzene was removed by distillation at a liquid temperature of 96° C. The addition of 38.7 g. (0.25 mole) of succinyl chloride was then made, dropwise, over about one hour at 93-96° C., followed by heating at the same temperature for about 6 hours. The product was then stripped of benzene and hydrochloric acid under 20 mm. pressure to a liquid temperature of 170° C. Carbon dioxide was used for ebullition during this latter operation. A total of 474 grams of product was obtained. The product contained 96% by weight of the di-esters of succinic acid by saponification analysis.

The physical properties are tabulated below.

| Butyl Monoethers | | | | Succinate of Butyl Monoethers | | |
|---|---|---|---|---|---|---|
| Oxide Ratio | Mol. Wt. | Visc., Centistokes | | Visc. Ratio 100° F./210° F. | Visc., Centistokes | | Visc. Ratio 100° F./210° F. |
| | | 100° F. | 210° F. | | 100° F. | 210° F. | |
| 50-50 | 912 | 53.9 | 10.66 | 5.05 | 182 | 31.3 | 5.72 |

Succinate of butyl monoethers

Specific viscosity benzene solution, 18° C __ .2705
Absolute density, 20° C _____ 1.0507
Refractive index, 20° C _____ 1.4582
Viscosity index, A. S. T. M. D-567-41 _____ 141
Misc. temp. with equal volume mineral oil, SAE 30, °C. _____>200

The succinate esters of the butyl monoethers are useful as plasticizers and as textile lubricants.

We claim:

1. Esters of a mixture of monohydroxy oxyethylene oxy 1,2-propylene aliphatic monoethers in which the aliphatic monoether group has from one to fourteen carbon atoms and in which the ratio of oxyethylene groups to oxy 1,2-propylene groups combined in the molecule ranges from 3 to 1 to 1 to 9 by weight and in which said groups contribute at least 500 to the molecular weight of said mixture, with an organic carboxylic acid consisting solely of the elements carbon, hydrogen and oxygen and having from one to two carboxyl groups and from 2 to 20 carbon atoms to the molecule.

2. Esters of a mixture of monohydroxy oxyethylene oxy 1,2-propylene butyl monoethers in which the ratio of oxyethylene groups to oxy 1,2-propylene groups combined in the molecule ranges from 3 to 1 to 1 to 9 by weight and in which said groups contribute at least 700 to the molecular weight of said mixture, with an organic carboxylic acid consisting solely of the elements carbon, hydrogen and oxygen and having from one to two carboxyl groups and from 2 to 20 carbon atoms to the molecule.

3. Esters as defined in claim 2 in which the acid is an aliphatic monocarboxylic acid containing from 2 to 18 carbon atoms.

4. Esters as defined in claim 2 in which the acid is acetic acid.

5. Esters as defined in claim 2 in which the acid is 2-ethylhexanoic acid.

6. Esters as defined in claim 2 in which the acid is stearic acid.

HARVEY R. FIFE.
FREDERICK H. ROBERTS.

REFERENCES CITED

The following references are of record in the file of this patent:

UNITED STATES PATENTS

| Number | Name | Date |
|---|---|---|
| 1,739,315 | Kessler | Dec. 10, 1929 |
| 2,269,529 | Goldsmith | Jan. 13, 1942 |

Certificate of Correction

Patent No. 2,480,185 — August 30, 1949

HARVEY R. FIFE ET AL.

It is hereby certified that error appears in the printed specification of the above numbered patent requiring correction as follows:

Column 11, Example 5, in the table, seventh column thereof, for "31.3" read *31.8*; and that the said Letters Patent should be read with this correction therein that the same may conform to the record of the case in the Patent Office.

Signed and sealed this 10th day of January, A. D. 1950.

[SEAL]

THOMAS F. MURPHY,
*Assistant Commissioner of Patents.*